(12) United States Patent
Ghezzi

(10) Patent No.: US 8,894,053 B2
(45) Date of Patent: Nov. 25, 2014

(54) BEVELLING APPARATUS FOR PRODUCING SCREWS AND THE LIKE

(75) Inventor: Enrico Ghezzi, Tortona (IT)

(73) Assignee: S.M.A.R.T. S.r.L. (IT)

(*) Notice: Subject to any disclaimer, the term of this patent is extended or adjusted under 35 U.S.C. 154(b) by 507 days.

(21) Appl. No.: 13/382,074

(22) PCT Filed: Jul. 12, 2010

(86) PCT No.: PCT/IB2010/001715
§ 371 (c)(1),
(2), (4) Date: Jan. 3, 2012

(87) PCT Pub. No.: WO2011/004259
PCT Pub. Date: Jan. 13, 2011

(65) Prior Publication Data
US 2012/0100920 A1    Apr. 26, 2012

(30) Foreign Application Priority Data
Jul. 10, 2009    (IT) ............... GE2009A0050

(51) Int. Cl.
*B25B 1/14*    (2006.01)
*B23Q 3/08*    (2006.01)
*B23Q 1/60*    (2006.01)
*B23B 31/28*    (2006.01)
*B24B 9/00*    (2006.01)

(52) U.S. Cl.
CPC ............... *B23Q 1/601* (2013.01); *B23B 31/28* (2013.01); *B24B 9/005* (2013.01)
USPC ............... 269/3; 269/228; 269/32; 269/24

(58) Field of Classification Search
CPC ......... B23B 31/28; B24B 9/005; B23Q 1/601
USPC ....................... 269/24–27, 32, 228
See application file for complete search history.

(56) References Cited

U.S. PATENT DOCUMENTS

2006/0033253 A1*    2/2006    McCormick et al. ......... 269/239

FOREIGN PATENT DOCUMENTS

| DE | 43 90 874 C1 | 2/1997 |
| FR | 1 359 980 A | 4/1964 |

* cited by examiner

*Primary Examiner* — Lee D Wilson
*Assistant Examiner* — Nirvana Deonauth
(74) *Attorney, Agent, or Firm* — R. Neil Sudol; Henry D. Coleman

(57) ABSTRACT

A beveling apparatus, for manufacturing screws and the like, includes a fixed support structure, which includes a first motor unit and a second motor unit which actuate a pliers unit adapted to lock an item to be machined and associated with a movable supporting structure. The first motor unit is constituted by a pair of linear motors having rotors associated with a carriage which actuates the pliers unit. The second motor unit has a pair of linear motors having rotors associated with the movable supporting structure so as to actuate the axial movement of the movable supporting structure with respect to the fixed supporting structure in order to define at least two operating positions of the pliers unit; a position for picking up and unloading the item to machined, in which the pliers unit is at a certain distance from a machining head of a machine tool, and a position for machining the item, in which the pliers unit is located at the machining head of a machine tool.

3 Claims, 5 Drawing Sheets

BEVELLING APPARATUS FOR PRODUCING SCREWS AND THE LIKE

BACKGROUND OF THE INVENTION

The present invention relates to a bevelling apparatus for manufacturing screws and the like.

A bevelling machine is an apparatus used to machine the ends of items, such as screws and bolts and other special parts, by means of chip-forming machining.

The bevelling unit can be associated with a rolling unit, be inserted within a so-called bolt maker, i.e., a pressing, bevelling and rolling machine, or also be provided as a stand-alone machine.

The operating cycle of a bevelling machine provides for feeding the items by means of inclined guides or, for headless items, by means of a tube, in order to insert the items between two locking jaws, one at a time.

When an item is inserted, the jaws are locked and the item is pushed on a rotating mandrel by means of the descent of the pliers or, more rarely, the ascent of the mandrel.

Once machining is complete, the part is unloaded.

In bevelling machines of the traditional type, all the movements are performed by virtue of rotating electric motors, reduction units, cams, levers, bearings, et cetera, and this entails the ordinary drawbacks of complex mechanical structures.

In traditional bevelling machines, the adjustments are laborious and it is very complicated to change the operating parameters such as the descent and ascent rate of the head and the locking force of the pliers.

Also, traditional machines are subject to plays caused by wear of the locking mechanism and of the components in general, which force to perform frequent and laborious maintenance operations.

OBJECTS OF THE INVENTION

The aim of the present invention is to provide a bevelling machine that overcomes the drawbacks of the cited prior art.

Within the scope of this aim, an object of the invention is to provide a bevelling machine that is very easy to adjust and which allows the possibility of varying and adapting, simply and rapidly, various operating parameters, such as the descent and ascent rates of the head and the locking force of the pliers.

Another object of the invention is to provide a bevelling machine that has reduced wear of the components and accordingly minimal maintenance.

Another object is to provide a bevelling machine that allows simple compensation of the ordinary plays induced by wear of the locking mechanism.

A further object of the invention is to provide a bevelling machine that has a lower production cost than bevelling machines having a traditional structure and can be manufactured with greater simplicity and speed of assembly.

Another object of the invention is to provide a bevelling machine that allows to control its operation.

Another object of the present invention is to provide an apparatus which, by virtue of its particular constructive characteristics, is capable of giving the greatest assurances of reliability and safety in use.

SUMMARY OF THE INVENTION

This aim and these and other objects that will become better apparent hereinafter are achieved by a bevelling apparatus for manufacturing screws and the like, characterized in that it comprises a fixed supporting structure, which comprises a first motor unit and a second motor unit which actuate a pliers unit that is adapted to clamp an item to be machined and is associated with a movable supporting structure; said first motor unit is constituted by a pair of linear motors having rotors associated with a carriage which actuates said pliers unit; said second motor unit comprises a pair of linear motors having rotors associated with said movable supporting structure in order to control the axial movement of said movable supporting structure with respect to said fixed supporting structure in order to define at least two operating positions of said pliers unit: a position for picking up and unloading said item to be machined, in which said pliers unit is at a certain distance from a machining head of a machine tool, and a position for machining said part, in which said pliers unit is located at the machining head of the machine tool.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

Figure 1:
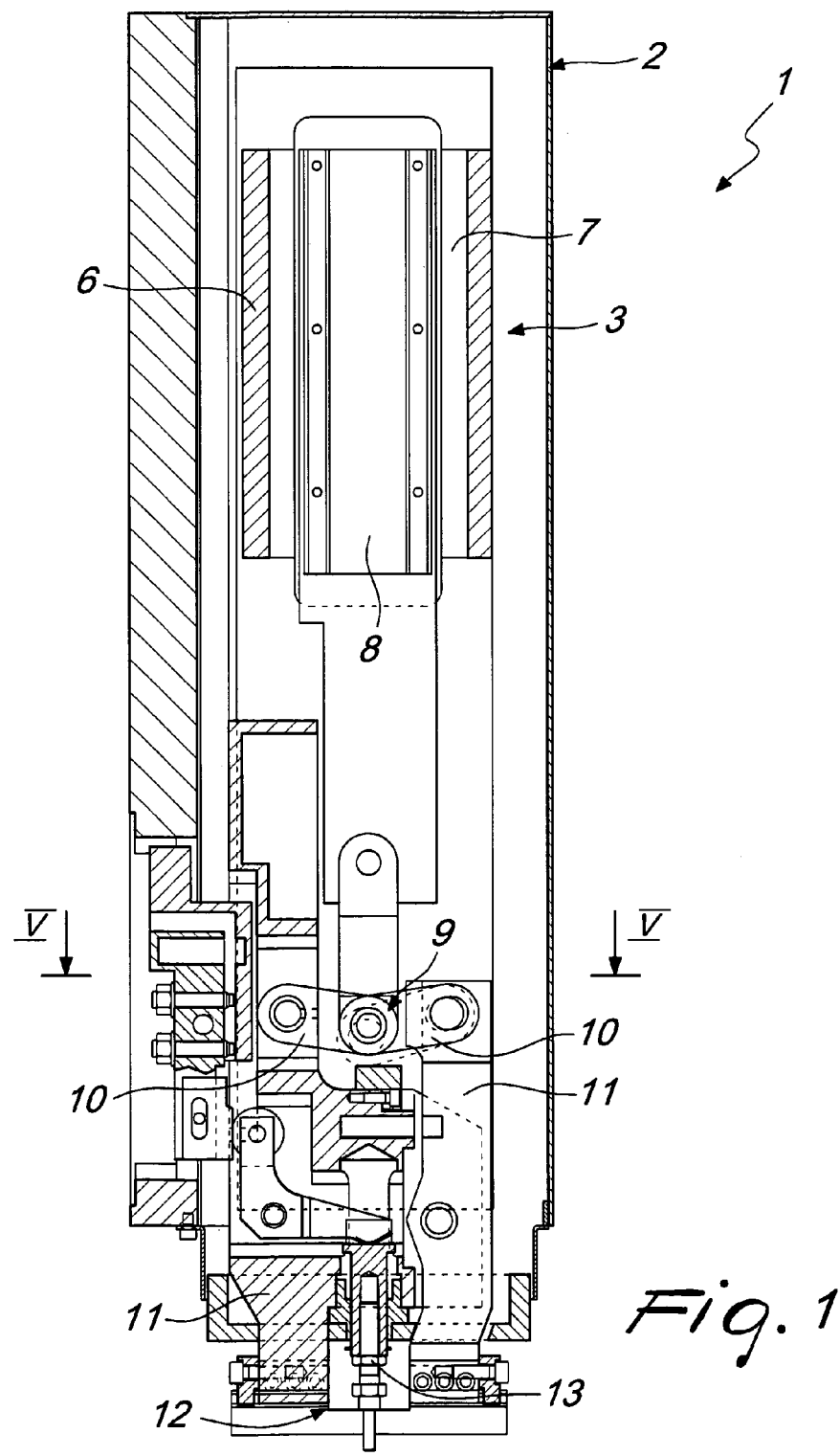
FIG. 1 is a longitudinally sectional side view of the bevelling apparatus according to the present invention.
Figure 2:
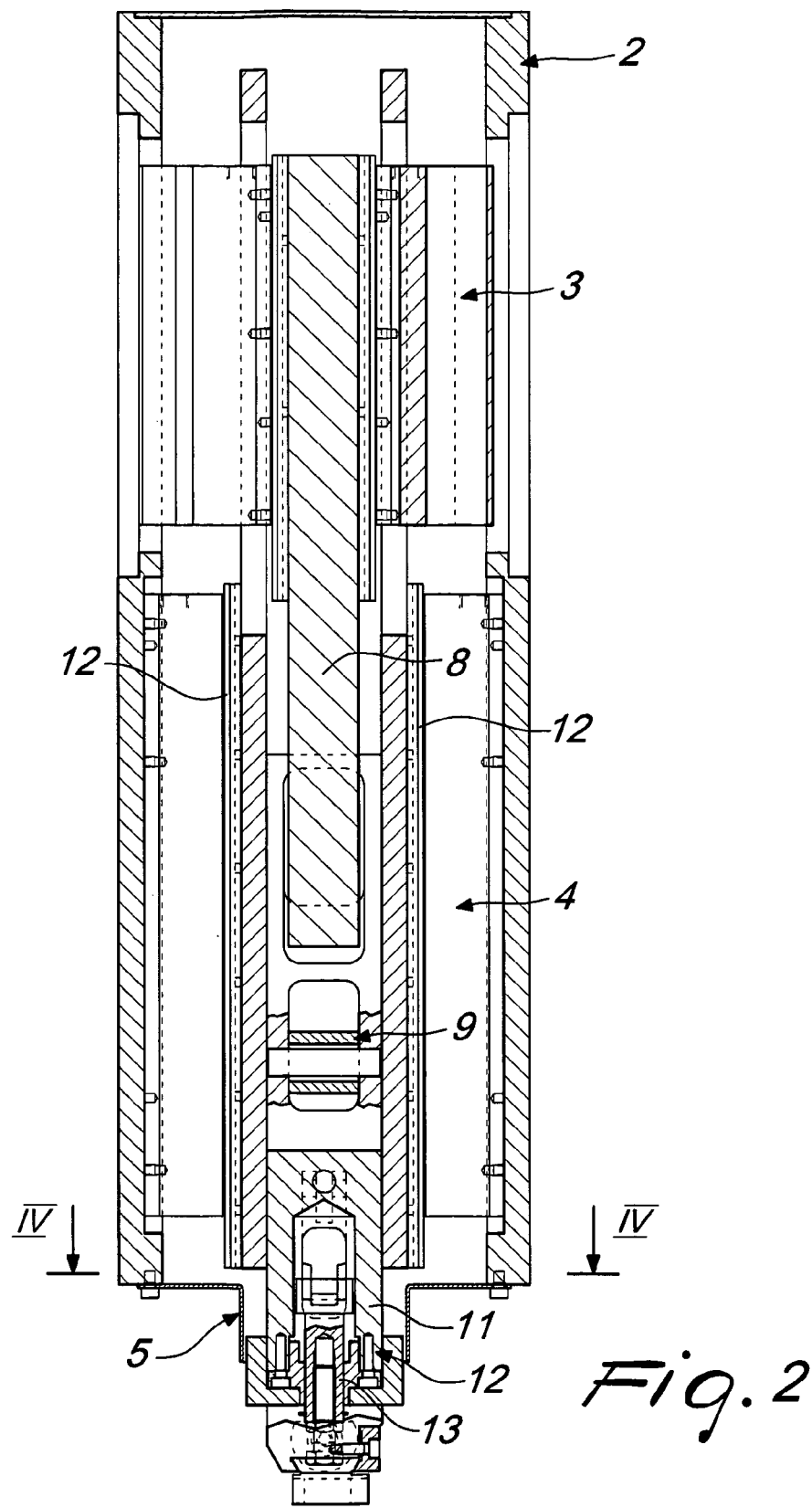
FIG. 2 is a longitudinally sectional front view of the bevelling apparatus according to the present invention.
Figure 3:
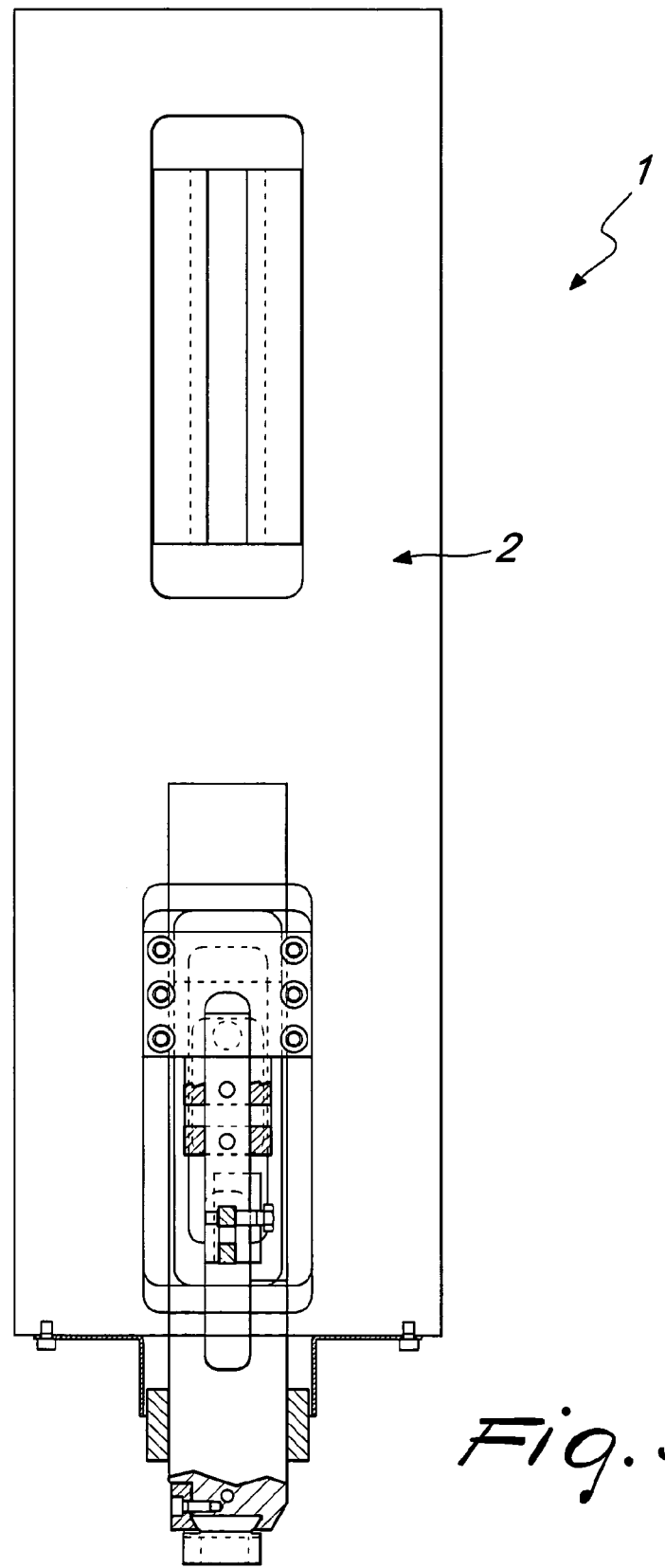
FIG. 3 is a longitudinally sectional rear view of the bevelling apparatus according to the present invention.
Figure 4:
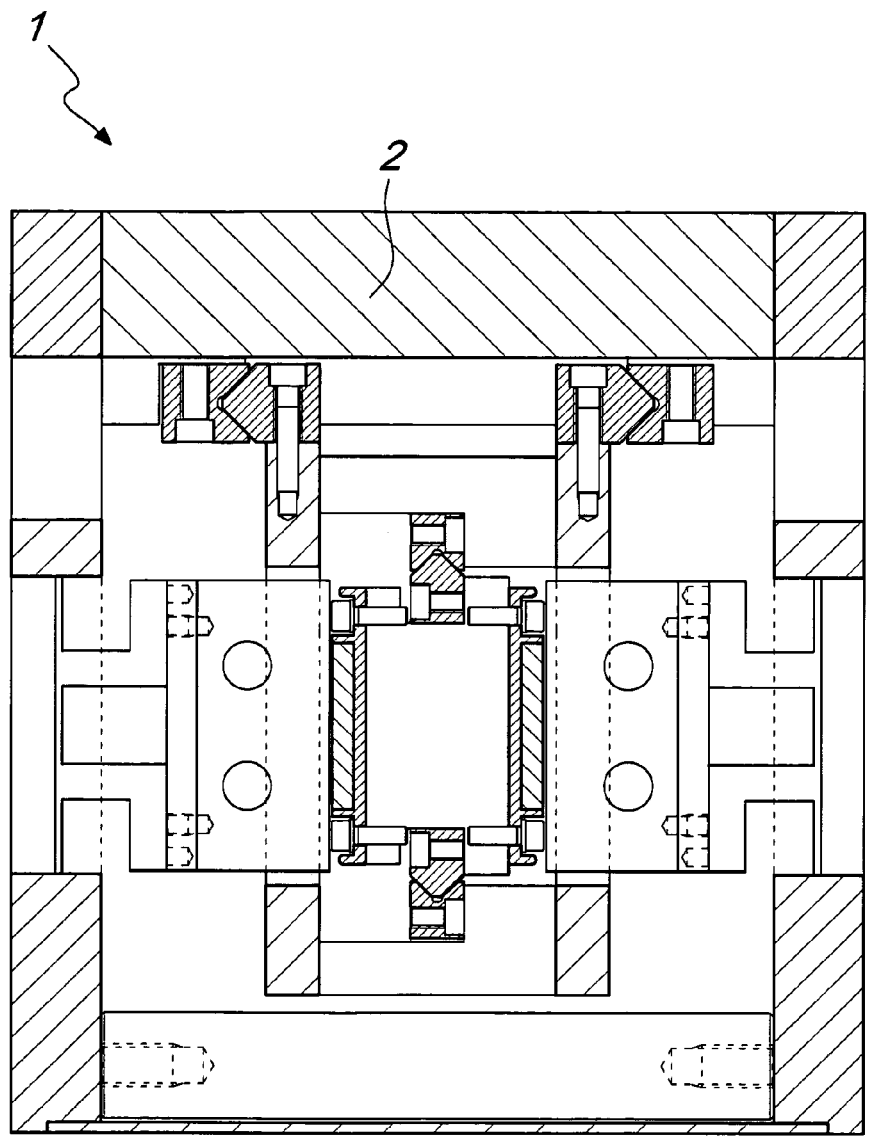
FIG. 4 is a transverse sectional view, taken along the plane IV-IV of FIG. 2.
Figure 5:
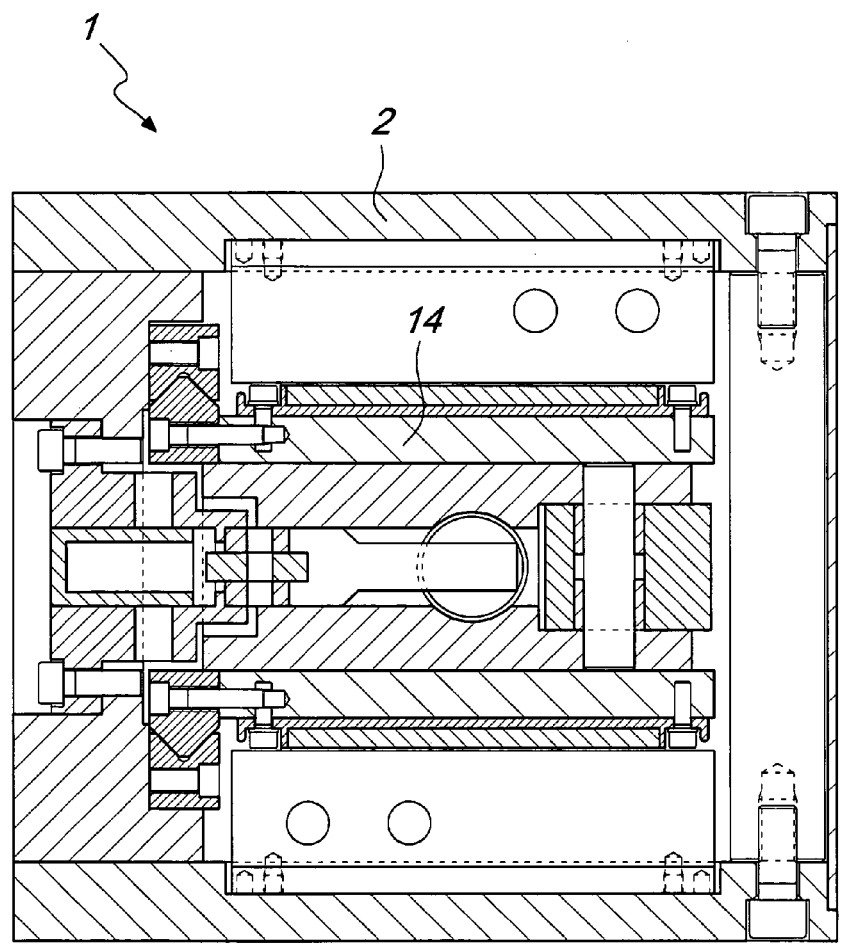
FIG. 5 is a transverse sectional view, taken along the sectional plane V-V of FIG. 1.

With reference to the cited figures, the bevelling apparatus according to the invention, generally designated by the reference numeral 1, comprises a fixed supporting structure 2.

The apparatus 1 can be associated with a machine used to manufacture screws and the like, such as a rolling machine or a so-called bolt maker, i.e., a machine constituted by the combination of a pressing machine, a bevelling machine and a rolling machine.

The apparatus 1 according to the present invention can also constitute a stand-alone machine.

The operating members of the apparatus are contained in the fixed supporting structure 2 and essentially comprise a first motor unit 3 and a second motor unit 4, which actuate a pliers unit 5 adapted to lock the part to be machined.

The first motor unit 3 is constituted by a pair of linear motors, designated respectively by the reference numerals 6 and 7, the rotors of the linear motors are jointly connected to a carriage 8, which pushes a double toggle 9, which includes two levers 10.

The levers 10 of the toggle 9 are connected to respective jaws 11 of a pliers 12 that is adapted to lock a part 13 being machined.

The jaws 11 are hinged to a movable supporting structure 14, which can move axially with respect to the fixed supporting structure 2, so that a movement of the double toggle 9, induced by the carriage 8 actuated by the first motor unit 3, is matched by a locking or opening movement of the active ends of the jaws 11.

The movement of the pliers unit 5 toward and away from the head of the mandrel is performed by the second motor unit 4, which is constituted by a pair of linear rotors 12, which are jointly connected to a movable supporting structure 14, which supports the pliers unit 5.

The operation of the apparatus according to the invention is as follows.

An item 13 to be machined is inserted between the jaws 11, preferably by means of an insertion device which includes a linear motor, which is not visible in the figures.

When the item 13 has been inserted, the jaws 11 are locked onto the part by the action of the first motor unit 3, which moves the carriage 8, which in turn acts on the double toggle 9.

When the item 13 is locked between the jaws, the second motor unit 4 lowers the movable supporting structure 14 until it reaches the machining position at the head of the mandrel of the machine tool.

Once machining has been completed, the movable supporting structure is lifted and the jaws are opened in order to unload the item, which is collected by an adapted collecting means.

The advantages offered by the apparatus according to the present invention are numerous and important.

First of all, it is extremely easy to adjust, offering the possibility to adapt the descent and ascent rates of the head by simple software parameters.

Likewise, it is possible to determine precisely the locking force of the pliers and the compensation of the normal play-related wear of the locking mechanism by means of software.

The structure with linear motors of the present apparatus minimizes the wear of the components and therefore requires reduced maintenance.

From the point of view of the manufacturer, there is a significantly reduced production cost, which leads to a lower cost for the buyer for an apparatus which is technically superior to traditional and more expensive bevelling machines.

The construction of the present apparatus and the computerized control systems allow to control its operation and the status of the hardware via remote service.

The entire production cycle is controlled in each instance by means of software, which allows to verify the quality of each manufactured product part.

The adjustments performed by the software can be stored for each type of part, so that it is possible to change machining rapidly and very easily.

In practice it has been found that the invention achieves the intended aim and objects, providing a bevelling apparatus that is technically superior in terms of performance and reliability to traditional machines and is at the same time cheaper both to purchase and to operate.

The invention claimed is:

1. A beveling apparatus for manufacturing screws and the like, comprising a fixed support structure, which comprises a first motor unit and a second motor unit which actuate a pliers unit that is adapted to clamp an item to be machined and is associated with a movable supporting structure; said first motor unit is constituted by a pair of linear motors having rotors associated with a carriage which actuates said pliers unit; said second motor comprises a pair of linear motors having rotors associated with said movable supporting structure in order to control the axial movement of said movable supporting structure with respect to said fixed supporting structure in order to define at least two operating positions of said pliers unit; a position for picking up and unloading said item to machined, in which said pliers unit is at a certain distance from a machining head of a machine tool, and a position for machining said part, in which said pliers unit is located at the machining head of a machine tool.

2. The apparatus according to claim 1, wherein said pliers unit comprises two jaws; said carriage being adapted to push a double toggle, which comprises two levers connected to said jaws; said jaws being pivoted to said movable supporting structure, which can move axially with respect to said fixed supporting structure, so that a movement of said double toggle induced by said carriage actuated by said first motor unit is matched by a locking or opening movement of the active ends of said jaws.

3. The apparatus according to claim 2, further comprising an insertion device which comprises a linear motor and is adapted to insert an item to be machined between said jaws.

* * * * *